March 20, 1962 M. MAY ETAL 3,026,500

ELECTRONIC CIRCUITS FOR SELECTIVELY SHIFTING THE TIME POSITION OF DIGITAL DATA

Original Filed Nov. 30, 1953

3 Sheets-Sheet 1

INVENTORS.
MICHAEL MAY,
DANIEL L. CURTIS,
BY Edward J. Dakin
Agent

INVENTORS.
MICHAEL MAY,
DANIEL L. CURTIS,
BY Edward J. Dakin
Agent

INVENTORS.
MICHAEL MAY,
BY DANIEL L. CURTIS,
Edward J. Dakin
Agent

United States Patent Office 3,026,500
Patented Mar. 20, 1962

3,026,500

ELECTRONIC CIRCUITS FOR SELECTIVELY SHIFTING THE TIME POSITION OF DIGITAL DATA

Michael May, Santa Monica, and Daniel L. Curtis, Manhattan Beach, Calif., assignors to Hughes Aircraft Company, Culver City, Calif., a corporation of Delaware Continuation of abandoned application Ser. No. 395,212, Nov. 30, 1953. This application Aug. 29, 1957, Ser. No. 681,042
19 Claims. (Cl. 340—174.1)

This invention relates to electronic circuits for selectively shifting the time position of digital data and, more particularly, to electronic circuits which may be utilized in a computer system for high-speed selective shifting of digital input information in time position in response to applied shift signals, the time position being designated with respect to a reference time interval and a specific circuit position.

This application is a continuation of the earlier filed application entitled "Electronic Circuits for Selectively Shifting the Time Position of Digital Data," Serial No. 395,212, now abandoned, filed on November 30, 1953, by Michael May and Daniel L. Curtis.

In conventional serial circuits for time position shifting, the information to be shifted is serially passed through a unit delay section a number of times corresponding to the total phase shift desired. In the serial binary computer described in copending U.S. patent application, Serial No. 319,815, now Patent No. 2,936,116, for "Electronic Digital Computer" by P. A. Adamson et al., filed November 12, 1952, for example, a left shift of X binary digits is achieved by serially shifting an N-digit binary input number through a unit binary delay section, such as a flip-flop, during X successive cycles, each cycle including N binary digit time intervals; wherein a time delay of N intervals is considered a zero shift or a reference. In a similar manner, a right shift of X binary digits is achieved by either shifting the input number through the unit binary delay section during $N-X$ successive cycles, or by shifting the number through a circulation path of $N-X$ binary digit delays during N digit time intervals. The same shifting procedure may be utilized in a serial binary-coded decimal computer system wherein each unit digit delay includes four binary digit delay sections connected in series.

The above-described shifting procedure provides a suitable operation during repetitive arithmetic operations such as multiplication and division since during such operations the arithmetic quantities to be shifted are being serially operated upon during successive cycles, each cycle including N digit time intervals. It is apparent, however, that this method of time position shifting is not suitable where it is necessary to prepare arithmetic quantities for operation very rapidly; as, for example, in business data processing where it is frequently necessary to extract and shift positions of applied information signals prior to each arithmetic operation. This problem arises because business data is frequently arranged in a manner which is incompatible with that required in the computer. Were it necessary, then, to serially shift the arithmetic quantities to the left or right in the above-described manner prior to each operation such as addition or subtraction it is apparent that a greater total time would be required in the preparation of the arithmetic quantities for the operation than for the operation itself.

It becomes imperative, therefore, that some means be provided in serial operating computers which are to be adapted for business data systems for shifting right or left at high speed in synchronization with the computer operation. One obvious manner of achieving the desired operation is to utilize a number of unit delay sections connected in series equal to the total number of left or right shift possibilities. While this technique is conceptually simple, a considerable number of digit delay elements, such as flip-flops or passive elements with associated amplifiers, are required. In addition, special circuits are required for synchronizing the delay elements and magnetic drum operation.

The present invention provides a high speed shifting circuit which is specifically designed for a business data computer system wherein applied input signals are shifted in time position with substantially no delay and in synchronism with the computer operations. Left shift operations in the embodiments of the present invention may be performed without any delay except that inherent in the position change due to the shift, and right shift operations are performed during an operating time equal to N digit time intervals, where N is the number of digits represented by the applied input signals.

Selective shifting, according to the present invention, is achieved through a parallel writing head positioned across several channels of a magnetic drum and a plurality of reading heads positioned from the writing head along the drum channels at distances from the writing head providing a series of successively increasing digit delays, respectively. A left shift of X digits is obtained by reading through a head which provides X digit delays with respect to the reference time position of the applied input signals, the total delay X being considered as including any delays in writing signals on, or reading signals from, the drum.

A right shift of X digits is performed by reading through a head providing a digit delay of $n-X$ digits, where $n$ corresponds to the maximum number of digit shifts desired (zero being included as a possible shift selection) and is not necessarily equal to N.

An important feature of the present invention is that the selection of signals produced by the heads on the drum is achieved through a single output circuit including the necessary amplification stages, the desired selection operation being controlled through a gating matrix which responds directly to signals produced by the heads. It is thus made possible to obtain a considerable number of equivalent delay sections through a single set of amplifier stages obviating the necessity of separate amplifiers for each delay section as would be required in the utilization of prior art delay circuits.

Since the selective shifting operation is achieved through a magnetic drum circuit, the operation of this circuit may be directly synchronized with the normal operation of an associated computer. Thus, no additional synchronizing circuits are required to insure that the equivalent delay sections provided by the drum shifting circuits are synchronized with the computer operation.

In its basic structural form the present invention comprises a magnetic drum circuit including a parallel writing head and a series of reading heads $H(m+1)$ . . . $Hn$, positioned from the writing head, along the circumference of the magnetic drum in the direction of drum rotation so as to provide write-read delays of $(m+1)$ . . . $n$ digits, respectively. The delay of $(m+1)$ digits represents the minimum head spacing between the writing head and reading head $H(m+1)$ allowing reliable writing and reading without crosstalk or an undesirable increase in noise level. The considerations which affect the selection of the parameter delay $m$ are presented in the detailed description which follows. As above, the delay of $n$ digits corresponds to the maximum number of delays desired, including a zero delay, and need not be equal to the number of digits N in the input information.

Input signals I to be shifted are applied through an input circuit to the parallel writing head on the drum as well as to a plurality of series connected delay sections D1 . . . D$m$ providing delays required which are less than the minimum delay $(m+1)$ which may be provided by the drum circuit. In considering the shift selection operation of the invention, it is convenient to represent all reading circuits, whether associated with delay sections D1 . . . D$m$, heads H$(m+1)$ . . . H$n$, or responsive to signals I without delay; as circuits R0, R1, . . . R$k$ . . . R$n$ providing output signals corresponding to applied input signals I after delays of: 0, 1, . . . $k$ . . . $n$, respectively. The letter $k$ is utilized to represent any of the delays 0 through $n$. Each reading circuit R$k$ is assumed to produce output signal series $R_k$ which corresponds to applied signal series I after a delay of $k$ digit intervals.

The amount of right or left shift desired in the operation of the invention is specified by a set of shift magnitude signals $Sh^j$, where $j$ indicates the binary digit position in the code of the magnitude signals. The shift magnitude signals $Sh^j$ are applied to a shift control matrix which produces a series of shift control signals $$C_0 \ldots C_k \ldots C_n$$

indicating that delays of 0, . . . $k$, . . . and $n$ are specified by the set of applied shift magnitude signals $Sh^j$. Signals $C_k$ are then utilized in a right or left shift gating matrix to control the gating of selected signals $R_k$ during left shift operations, indicated by a shift control signal $Ls$, and to control the gating of selected signals $R_{n-k}$ during right shift operations, indicated by a shift control signal $Rs$. During right shift operations, input signals I are initially shifted into the drum circuit during $n$ successive digit time intervals so that the first input digit $I_1$ is available for reading at reading circuit R$n$, input digit $I_{(n-k+1)}$ being available at reading circuit R$k$, as may be appreciated from an examination of FIG. 1$a$. A right shift signal, $R_s$ is a signal which allows a predetermined time to elapse in the computer proper and during this interval the input signals I are recorded on the drum 100. The right shift operation will then be referenced with respect to this delay interval which may be one word time. During the right shift operations, the signals $R_0 \ldots R_n$ are read out from reading heads H$n$ . . . H$(m+1)$ in that order, or in the reverse order from a left shift operation. To appreciate that the input signals I have been right shifted or left shifted, the relative positions of each binary bit in each signal series I should be examined. For example, if a signal series comprises signals W$l$WW$r$ and a right shift of one is called for, the output signal will be arranged to read W$r$W$l$W. It will be immediately apparent that considering time T1 beginning with signal W$r$ in the initial signal series and increasing to the left, that signal W has been shifted one position to the right in the output signal series W$r$W$l$W. Correlating this right shift operation with a left shift operation it will now be seen that signal W$r$ in the output signal series has been shifted 2 positions to the left. Therefore, translating this signal series W$r$W$l$W in accordance with the above notation wherein a left shift equals X digits and a corresponding right shift is considered to be $n-X$ digits, $n$ being 3, in this instance the left shift (X) will be equal to 2 while the right shift of $n-X(3-2)=1$ and will be seen to check out.

Selected output signals $R_k$ during left shift of $k$ digits or signals $R_{n-k}$ during right shift of $k$ digits are applied to an output circuit which includes amplification stages for the selected signals $H_k$ and means for producing output signals $O_k$ corresponding to input signals I, without delay; to selected signals $D_k$ (any of signals $D_1$ through $D_m$); or to selected signals $H_k$. The output circuit is mechanized to provide signals which are suitable for computer operation.

Accordingly, it is an object of the present invention to provide a high-speed selective time position shifting circuit which may be utilized in magnetic drum computing systems, the shifting circuit requiring a minimum of additional writing and reading circuits and associated amplification stages.

Another object is to provide an electronic circuit for shifting the time position of input signal information wherein left shifting operations may be performed without delay and right shifting operations in an operating time equal to the serial time length of the input signal information.

A further object is to provide a magnetic drum shifting circuit which may be introduced into a serial magnetic drum computing system without the requirement of additional synchronizing circuits or additional drum reading circuits over that required for conventional serial shifting.

Yet another object of the invention is to provide a magnetic drum time position shifting circuit wherein input signals to be shifted are recorded in parallel in a number of drum channels and are read through separate reading heads, the heads being positioned at successively increasing intervals from the writing head; the shift selection desired being achieved by controlling the selection of the proper reading head.

The novel features which are believed to be characteristic of the invention, both as to its organization and method of operation, together with further objects and advantages thereof, will be better understood from the following description considered in connection with the accompanying drawings, in which one embodiment of the invention is illustrated by way of example. It is to be expressly understood, however, that the drawings are for the purpose of illustration and description only, and are not intended as a definition of the limits of the invention.

FIG. 1 is a block diagram of the basic embodiment of a shifting circuit according to the present invention;

FIG. 1$a$ is a time-sequence graph illustrating the operation of the embodiment of FIG. 1;

Figure 1:
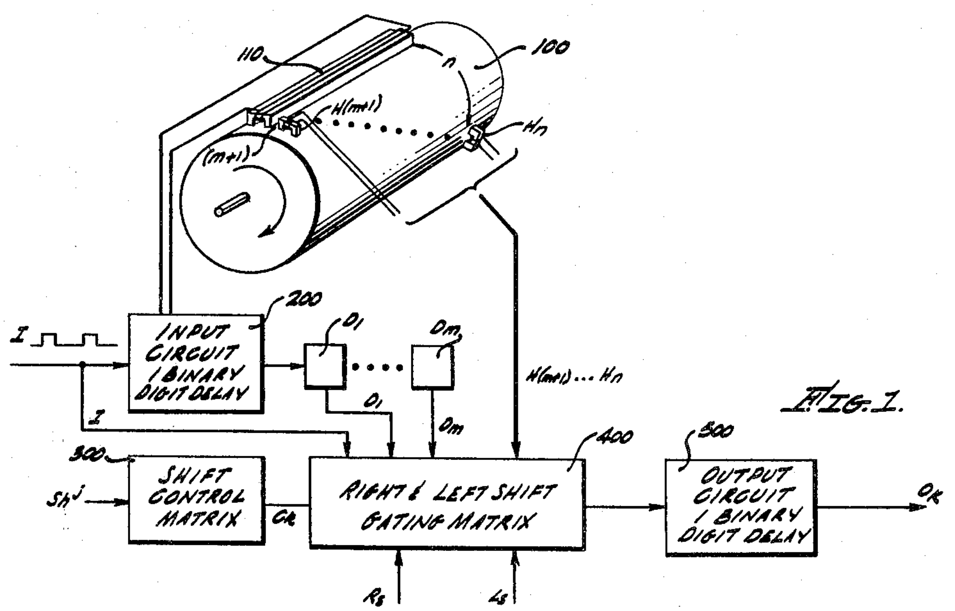
Figures 4, 5, 5A:
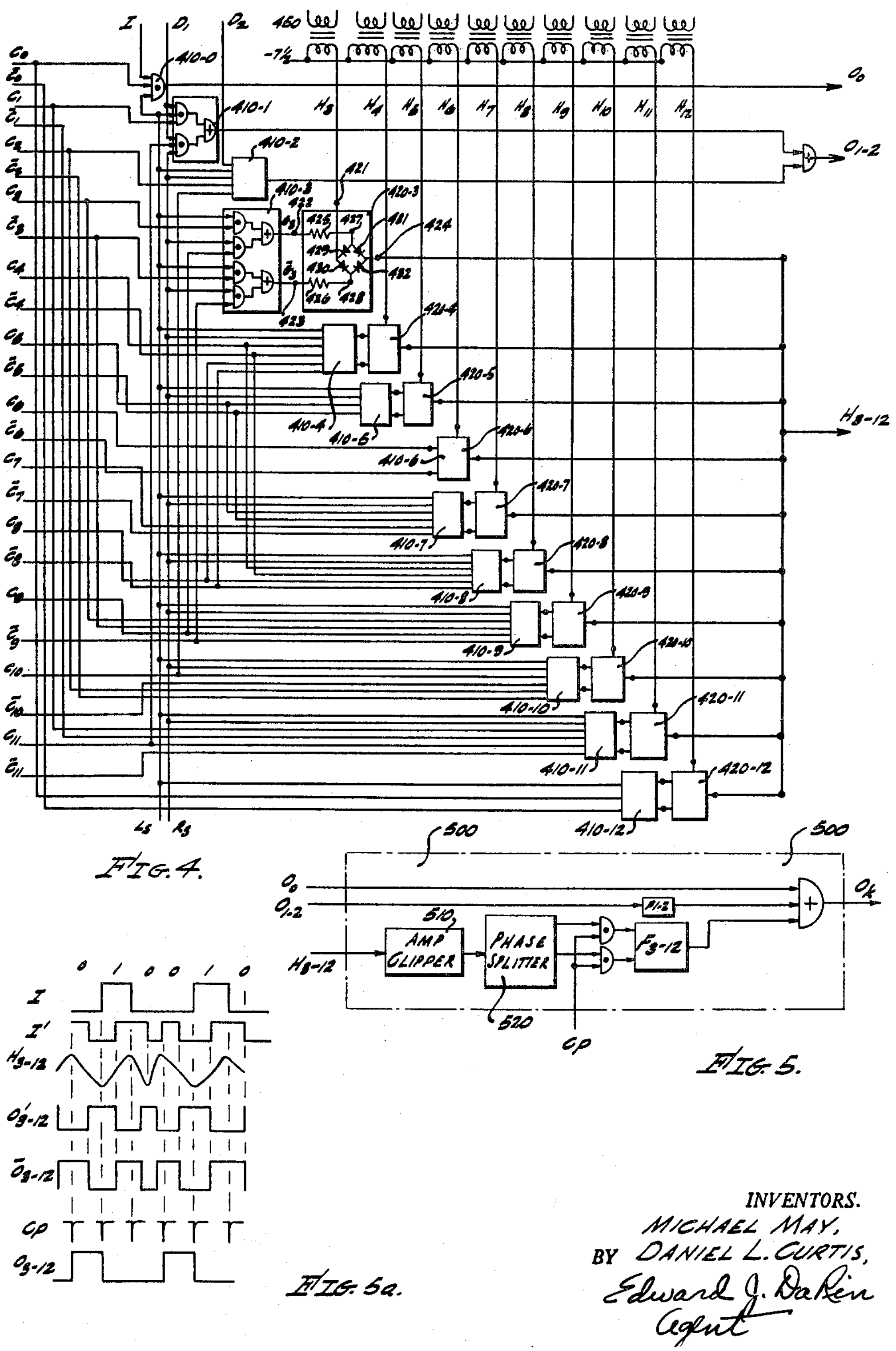

FIG. 4 is a schematic diagram of a suitable form of gating matrix 400 shown in FIG. 1; and FIG. 5 is a schematic diagram of a suitable form of output circuit 500 shown in FIG. 1, waveforms during the operation of circuit 500 being illustrated in FIG. 5$a$.

Reference is now made to FIG. 1 wherein there is shown one embodiment of an electronic circuit for selectively shifting the time position of digital data, according to the present invention. As shown in FIG. 1, the shifting circuit comprises a magnetic drum circuit including a drum 100, a parallel writing head 110, and a series of reading heads H$(m+1)$ . . . H$n$ positioned along the circumference of drum 100 in the direction of drum rotation, as indicated, so as to provide write-read delays of $(m+1)$ . . . $n$ digits, respectively.

A serial train of input signals I to be shifted are applied to an input circuit 200 which is operative to write signals I through head 110 on to drum 100. In considering the shift-selection portion of the invention, it must be specified that the number of digits in the serial train is fixed at N as defined in column 2 at line 17 of this specification. Input circuit 200 is also coupled to the first of a plurality of series connected delay sections D1 . . . D$m$, the number $m$ of delay sections being determined by the minimum head spacing permissible between writing head 110 and reading head H$(m+1)$, as is more fully explained below.

As pointed out above, it is convenient to consider all reading circuits, whether associated with delay sections D1 . . . D$m$, heads H$(m+1)$ . . . H$n$, or responsive to signals I without delay; as circuits R0, R1, . . . R$k$ . . . R$n$ producing output signals after corresponding delays.

The amount of right or left shift desired in the operation of the embodiment of FIG. 1 is specified by a set of shift magnitude signals $Sh^j$ applied to a shift control matrix 300, $j$ indicating the binary digit position in the code of selection signals, as will be more fully understood when a specific code is considered. Shift control matrix 300 produces a series of shift control signals $C_k$ indicating that a delay of $k$ digits is specified by the set of shift magnitude signals $Sh^j$. Signal $C_k$ is then utilized in a right or left shift gating matrix 400 to control the gating of selected signals $R_k$ during left shift operation, indicated by an applied shift direction signal $Ls$ and to control the gating of signals $R_{n-k}$ during right shift operations indicated by applied control signal $Rs$.

Selected output signals $R_k$, during left shifts of $k$ digits, or signals $R_{n-k}$ during right shifts of $k$ digits, are applied to output circuit 500 producing signals $O_k$ corresponding, to input signals I, without delay during zero shifts; to selected signals $D_k$ during any shifts requiring delays of $m$ digits or less; or to selected signals $H_k$ during shifts utilizing magnetic drum 100. Output circuit 500 is designed to translate drum signals into signals suitable for computer operation through a single set of amplification stages.

Figures 1A, 2, 2A:
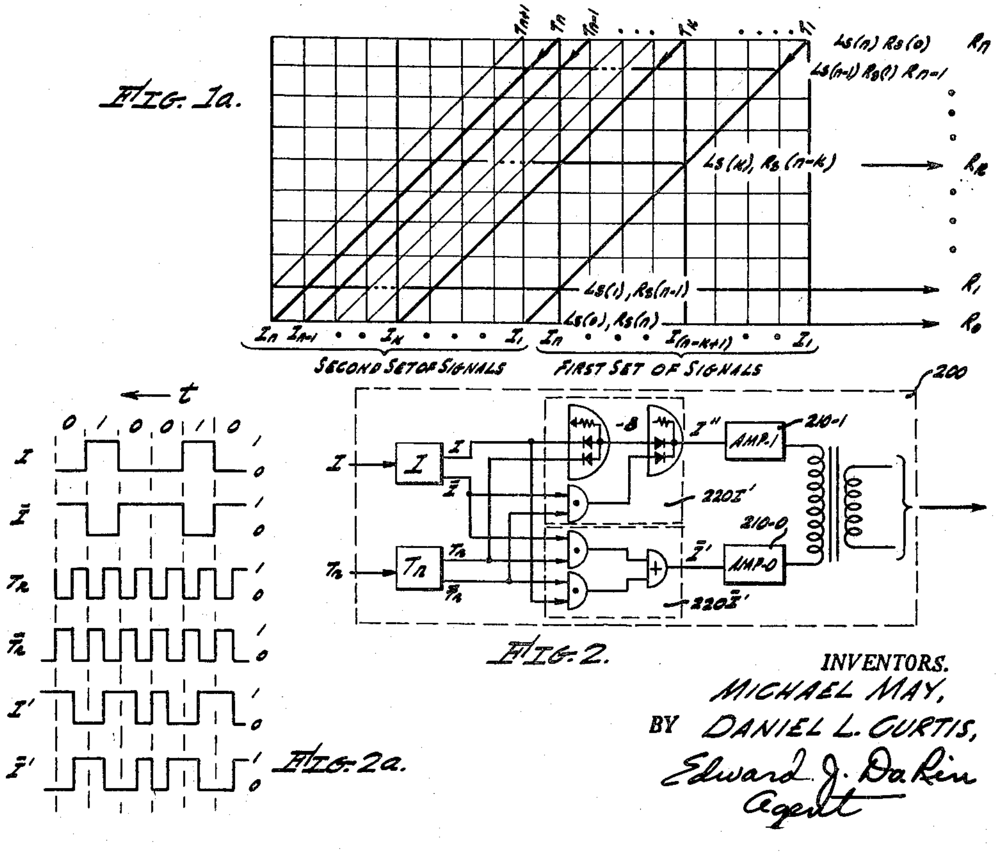
FIG. 2 is a schematic diagram of a suitable form of input circuit 200 shown in FIG. 1, waveforms during the operation of circuit 200 being illustrated in FIG. 2$a$.
Figure 3:
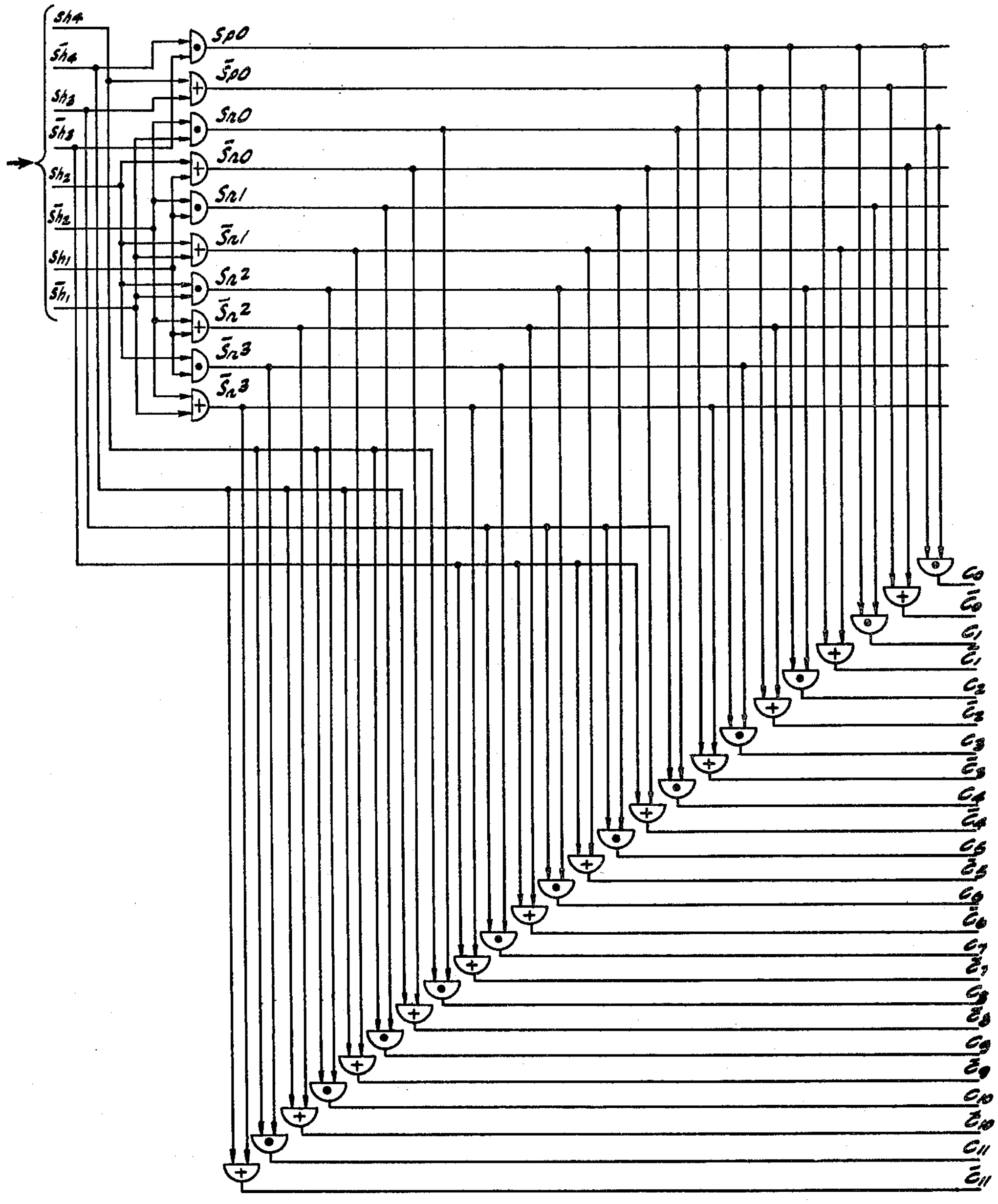
FIG. 3 is a schematic diagram of a suitable form of shift control matrix 300 shown in FIG. 1.

Before considering specific circuits which are suitable for use in the embodiment shown in FIG. 1, it is helpful in furthering the understanding of the invention to analyze its general time-sequence of operation as is illustrated in FIG. 1*a*. Referring now to FIG. 1*a*, it is noted that signals $R_0 \ldots R_k \ldots R_n$ are utilized to represent ordinate variables and that two sets of input signals $I_1 \ldots I_n$ are utilized to represent abscissa variables. The intersection of an ordinate variable $R_k$ with a diagonal time variable $T_i$ ($i$ representing any integer value) provides a correlation between output signal $R_k$ and input signal $I_{(n-k+1)}$, during right shift, and signal $I_k$ during left shift.

The first set of input signals I shown in FIG. 1*a* corresponds to signals which are initially entered on to drum 100 during $n$ successive digit time intervals from which the right shift is derived and the second set of input signals I corresponds to signals applied to input circuit 200 at the beginning of an operation utilized for left shift operations. During right shift operations then, the input signals of the first set are selected through reading circuit $Rk$ to provide a right shift of $n-k$ digits. Thus, in FIG. 1*a*, the horizontal line $Rk$ intersects the time coordinate $T_1$ at an abscissa point corresponding to input signal $I_{(n-k+1)}$ indicating that the first input digit read is in a position $n-k$ digits to the left of the input digit $I_1$, since an effective right shift of $n-k$ digits has been performed. It will be noted further that where $k$ is equal to $n$, input signal $I_1$ is selected at time $T_1$ so that a zero right shift may be performed and that where $k$ is equal to 1, input signal $I_n$ is read at time $T_1$ providing a right shift of $n-1$ digits.

In a similar manner the input digits of the second set are read through reading circuit $Rk$ to provide left shifts of $k$ digits. Thus, input circuit R0 reads signal $I_1$ of the second signal set at time $T_1$ providing a zero left shift; reading circuit $Rk$ produces signals corresponding to input signal $I_1$ at time interval $T_{1+k}$, and reading circuit $Rn$ produces a signal corresponding to input signal $I_1$ during time interval $T_{n+1}$.

It is evident from the time sequence graph illustrated in FIG. 1*a* that one manner of achieving the desired series of successively increasing digit delays through heads $H(m+1) \ldots Hn$ is to arrange the heads on separate channels $CH(m+1) \ldots CHn$ at distances from writing head 110 of $(m+1) \ldots n$ digits, respectively. With this arrangement the time coordinate $T_1$ of FIG. 1 may be considered to correspond to the physical arrangement of the heads on drum 100. However, with small reading heads it is possible to utilize fewer drum channels than the number of heads required to provide the number of delay sections required.

For example, with a binary cell density of 50 cells per inch, each decimal digit defined as including 4 binary cells and occupying .08 inch, and reading heads .5 inch long; the reading heads may be positioned on the same channel at 7-digit intervals. Thus, only 7 channels are required to provide any number of digit delays since after 7 reading heads have been positioned at successively increasing digit intervals on the 7 channels, the 8th reading head is again positioned on the first channel and so forth. In a similar manner, it is apparent that if the heads may be combined into single units with reading coils spaced at .24 inch, the coils may be positioned at 3 digit intervals on the same channel, and only three channels are required. Thus, where small reading heads are utilized, a series of diagonal head positions are specified, the diagonal positions returning to the first channel, representable as $CH(m+1)$ after a number of heads have been positioned on adjacent channels equal to the number of digits in the minimum space between the reading coils of the heads.

Since specific magnetic drum circuits suitable for providing the above-described operation are well known in the art, it is not considered necessary to describe such circuits in detail in this specification. Parallel writing head 110 may, for example, be provided by a transducer similar to that described in U.S. Patent No. 2,531,642 entitled "Magnetic Transducing System" by Ralph K. Potter, issued November 28, 1950. Reading heads $Hk$ may be provided by a plurality of single units each including several magnetic heads having a common flux path, such as are described in U.S. Patent No. 2,640,886 entitled "Magnetic Transducer Head" by Charles C. Davis, issued June 2, 1953. Drum 100 and the manner of head arrangement thereon may be similar to that described in U.S. Patent No. 2,617,705 entitled "Data Storage Apparatus" by John M. Coombs et al., issued November 11, 1952.

While several types of magnetic recording may be utilized such as the two or three level return signal recording described on pages 330 and 331 of "High-Speed Computing Devices" by the staff of Engineering Research Associates, Inc., published in 1950 by McGraw-Hill Book Company, Inc., it is preferred to utilize a type of recording wherein each binary digit is represented by a magnetic flux change or "couple." This type is described in U.S. Patent No. 2,609,143 entitled "Electronic Computer for Addition and Subtraction" by C. Stibitz, issued September 2, 1952, and on pages 94 through 106 of an article entitled "Universal High-Speed Digital Computers: A Magnetic Store" by Prof. F. C. Williams et al., in Proceedings of the I.E.E., Part II, April 1952, and is also considered in some detail in this specification, being referred to as "flux change" recording.

In order to indicate specific circuits which are suitable for use in the present invention, it is necessary to assume specific operation conditions; the assumptions, as an illustration being made as follows:

(1) That each digit includes four binary cells or bits, possibly representing decimal numbers in a binary-coded decimal computer system;

(2) That a maximum of 12 digit shifts are desired ($n=12$);

(3) That, with drum 100 providing binary digit signals at a 160,000 pulse-per-second rate, the minimum write-read head spacing without substantial crosstalk is .17 inch; and (4) That the binary cell density on the drum is to be 50 cells per inch.

With these assumptions, it is then possible to determine the parameter $m$, since $m+1$ must be an integral number of digits and must be greater than .17 times 50 binary delays or 8.5 binary delays. It is apparatus, then, that a suitable selection is that $m+1$ be equal to 3 digits or 12 binary delays. Thus, $m$ is equal to 2 digits or 8 binary delays, and consequently only two delay sections D1 and D2 are required, each delay section providing four binary delays. If a binary delay is required for writing signals on drum 100 and a half binary delay is required for reading signals from drum 100, as is considered below, then the spacing between writing head 110 and head H3 on drum 100 is equal to 10.5 binary cell positions or .21 inch. Heads H4 through H12 are then positioned at successive intervals of .08 inch from head H3.

Delay circuits suitable for utilization as delay sections D1 and D2 are well known in the computing art; one circuit being a flip-flop shifting register such as that described in U.S. Patent No. 2,580,771 entitled "Stepping Register" by Leonard R. Harper, issued January 1, 1952, and another circuit being a passive element shifting register such as that described in copending U.S. patent application Serial No. 300,286, now Patent No. 2,847,159, for "Passive Element Signal Stepping Device" by D. L. Curtis, filed July 22, 1952.

Although input signal I to be shifted may be represented by any type of digital signal series, it will be assumed, for illustrative purposes, that the signal I is composed of a series of binary digit representing signals having a 1 or 0 representing voltage level according to the particular value represented. Thus, input circuit 200 must provide a translation from voltage-level signals to the "couple-type" of signal assumed to be utilized for magnetic drum recording. An input circuit 200 for providing this translation is shown in FIG. 2, the operation of the circuit of FIG. 2 being illustrated by the waveforms shown in FIG. 2*a*. The circuit shown in FIG. 2 is only briefly considered herein since this circuit is described and claimed in copending U.S. patent application Serial No. 460,965, now abandoned, for "Circuits for Translating Signals for Magnetic Recording" by D. L. Curtis, filed October 7, 1954.

The structure of the circuit of FIG. 2 is best understood after first considering its function. Voltage level input signals I having waveforms as indicated in FIG. 2*a* are to be converted to the "couple-type" waveform I′ (also shown in FIG. 2*a*) which is utilized for recording according to the above-described "flux change" recording system. In order to achieve the translation from the waveform signal I to that of signal I′, a translation waveform *Tr* is produced either with a separate square wave generator or as a signal which is recorded on drum 100. Since specific circuits for providing such a signal are well known in the computing art, none are considered herein.

As indicated in the waveforms of FIG. 2*a*, signal I′ includes a 0 to 1 "couple" corresponding to each 0-representing voltage level of signal I and includes a 1 to 0 "couple" for each 1-representing voltage level of signal I. Thus, when waveform I is in a 0-representing state, the couple, $\overline{Tr}$, the complement of *Tr*, provides signal I′ and when signal I is in a 1-representing state, the couple $\overline{Tr}$ provides signal I′. This may be expressed logically as the function:

$$I'=\overline{I}.\overline{Tr}+I.Tr$$

where the dot (.) is the logical "and" and the plus (+) is the logical inclusive "or."

In the circuit of FIG. 2, the recording of 1-representing signals corresponding to signal $I'=1$, is made through a 1-writing amplifier 210–1 and signals corresponding to $\overline{I}'=1$ or $I'=0$ are provided by a 0-writing amplifier 210–0. Input signals applied to amplifier 210 may then be defined by the functions:

$$\text{Amplifier } \mathbf{210\text{–}1}=\overline{I}.\overline{Tr}+I.Tr=I'$$

$$\text{Amplifier } \mathbf{210\text{–}0}=\overline{I}.Tr+I.\overline{Tr}=\overline{I}'$$

The functions I′ and $\overline{I}'$ are provided by logical gating circuits 220I′ and 220$\overline{I}$′ respectively coupled to amplifier 210–1 and 210–0. Each of these logical gating circuits includes two "and" circuits for producing the corresponding "and" functions and an "or" circuit for combining the "and" functions. Suitable forms for "and" and "or" circuits are illustrated in logical gating circuit 220I′. These circuits are not explained in detail since they are well known in the art, similar circuits being shown in the above-mentioned patent to George Stibitz as well as on pages 511 through 514 of an article entitled "Diode Coincidence and Mixing Circuits in Digital Computers" by Tung Chang Chen in the Proceedings of IRE, May 1950, and in U.S. Patent No. 2,557,729 for "Impulse Responsive Network" by J. P. Eckert, issued June 19, 1951.

In order to specifically illustrate a suitable form for shift control matrix 300, it is assumed that shift control signals $Sh^j$ include 4 binary digits representable as $Sh^4$, $Sh^3$, $Sh^2$, and $Sh^1$, having weights of 8, 4, 2, and 1, respectively. The code which is utilized to represent shift control signals $C_0$ through $C_{11}$, is indicated in Table I below. No control signal $C_{12}$ is required since it is assumed that a shift of 12 digits corresponds to a zero shift, *n* being equal to 12.

*Table I*

| | $Sh^4$ | $Sh^3$ | $Sh^2$ | $Sh^1$ |
|---|---|---|---|---|
| $C_0$ | 0 | 0 | 0 | 0 |
| $C_1$ | 0 | 0 | 0 | 1 |
| $C_2$ | 0 | 0 | 1 | 0 |
| $C_3$ | 0 | 0 | 1 | 1 |
| $C_4$ | 0 | 1 | 0 | 0 |
| $C_5$ | 0 | 1 | 0 | 1 |
| $C_6$ | 0 | 1 | 1 | 0 |
| $C_7$ | 0 | 1 | 1 | 1 |
| $C_8$ | 1 | 0 | 0 | 0 |
| $C_9$ | 1 | 0 | 0 | 1 |
| $C_{10}$ | 1 | 0 | 1 | 0 |
| $C_{11}$ | 1 | 0 | 1 | 1 |

Suitable functions for providing signals $C_0$ through $C_{11}$ and complementary signals $\overline{C}_0$ through $\overline{C}_{11}$ required for controlling the gating of signals read from heads H3 through H12 may be provided as follows:

$$C_0=\overline{Sh}^4.\overline{Sh}^3.\overline{Sh}^2.\overline{Sh}^1=Sp^0.Sr^0$$
$$\overline{C}_0=Sh^4+Sh^3+Sh^2+Sh^1=\overline{Sp}^0+\overline{Sr}^0$$
$$C_1=\overline{Sh}^4.\overline{Sh}^3.\overline{Sh}^2.Sh^1=Sp^0.Sr^1$$
$$\overline{C}_1=Sh^4+Sh^3+Sh^2+\overline{Sh}^1=\overline{Sp}^0+\overline{Sr}^1$$
$$C_2=\overline{Sh}^4.\overline{Sh}^3.Sh^2.\overline{Sh}^1=Sp^0.Sr^2$$
$$\overline{C}_2=Sh^4+Sh^3+\overline{Sh}^2+Sh^1=\overline{Sp}^0+\overline{Sr}^2$$
$$C_3=\overline{Sh}^4.\overline{Sh}^3.Sh^2.Sh^1=Sp^0.Sr^3$$
$$\overline{C}_3=Sh^4+Sh^3+\overline{Sh}^2+\overline{Sh}^1=\overline{Sp}^0+\overline{Sr}^3$$
$$C_4=Sh^3.\overline{Sh}^2.\overline{Sh}^1=Sh^3.Sr^0$$
$$\overline{C}_4=\overline{Sh}^3+Sh^2+Sh^1=\overline{Sh}^3+\overline{Sr}^0$$
$$C_5=Sh^3.\overline{Sh}^2.Sh^1=Sh^3.Sr^1$$
$$\overline{C}_5=\overline{Sh}^3+Sh^2+\overline{Sh}^1=\overline{Sh}^3+\overline{Sr}^1$$
$$C_6=Sh^3.Sh^2.\overline{Sh}^1=Sh^3.Sr^2$$
$$\overline{C}_6=\overline{Sh}^3+\overline{Sh}^2+Sh^1=\overline{Sh}^3+\overline{Sr}^2$$
$$C_7=Sh^3.Sh^2.Sh^1=Sh^3.Sr^3$$
$$\overline{C}_7=\overline{Sh}^3+\overline{Sh}^2+\overline{Sh}^1=\overline{Sh}^3+\overline{Sr}^3$$
$$C_8=Sh^4.\overline{Sh}^2.\overline{Sh}^1=Sh^4.Sr^0$$
$$\overline{C}_8=\overline{Sh}^4+Sh^2+Sh^1=\overline{Sh}^4=\overline{Sr}^0$$
$$C_9=Sh^4.\overline{Sh}^2.Sh^1=Sh^4.Sr^1$$
$$\overline{C}_9=\overline{Sh}^4+Sh^2+\overline{Sh}^1=\overline{Sh}^4+\overline{Sr}^1$$
$$C_{10}=Sh^4.Sh^2.\overline{Sh}^1=Sh^4.Sr^2$$
$$\overline{C}_{10}=\overline{Sh}^4+\overline{Sh}^2+Sh^1=\overline{Sh}^4+\overline{Sr}^2$$
$$C_{11}=Sh^4.Sh^2.Sh^1=Sh^4.Sr^3$$
$$\overline{C}_{11}=\overline{Sh}^4+\overline{Sh}^2+\overline{Sh}^1=\overline{Sh}^4+\overline{Sr}^3$$

where:

$$Sp^0=\overline{Sh}^4.\overline{Sh}^3$$
$$\overline{Sp}^0=Sh^4+Sh^3$$
$$Sr^0=\overline{Sh}^2.\overline{Sh}^1$$
$$\overline{Sr}^0=Sh^2+Sh^1$$
$$Sr^1=\overline{Sh}^2.Sh^1$$
$$\overline{Sr}^1=Sh^2+\overline{Sh}^1$$
$$Sr^2=Sh^2.\overline{Sh}^1$$
$$\overline{Sr}^2=\overline{Sh}^2+Sh^1$$
$$Sr^3=Sh^2.Sh^1$$
$$\overline{Sr}^3=\overline{Sh}^2+\overline{Sh}^1$$

Since circuits providing switching according to the above-considered functions are well known in the art, it is not deemed necessary to consider the specific mechanization illustrated in FIG. 2. Reference is made to pages 40 through 43 of the previously mentioned book "High-Speed Computing Devices" wherein suitable forms of matrices for providing switching are described.

The shift control signals $C_0$ through $C_{11}$ and $\overline{C}_1$ through $\overline{C}_{11}$ are applied to gating matrix 400, illustrated in FIG. 4. Matrix 400 provides output signals $O_0$, $O_{1\text{-}2}$, and $O_{3\text{-}12}$ corresponding respectively to input signal I gated without delay signals produced by either of delay sections D1 or D2, and any of the signals produced by heads H3 through H12. It is assumed, again, that a left shift of 12 digits is not desired and that a right shift of zero digits is achieved through head H12. Output signals $O_k$ may then be defined by the generic function:

$$O_k = R_k.(Ls.C_k + Rs.C_{n-k})$$

indicating that signal $R_k$ is selected during left shifts of $k$ digits indicated by signal $C_k$ or during right shifts of $n-k$ digits indicated by $C_{n-k}$. A complete set of gating functions may then be specified as follows:

$$O_0 = I.Ls.C_0$$
$$O_1 = D_1.(Ls.C_1 + Rs.C_{11})$$
$$O_{1\text{-}2} = O_1 + O_2$$
$$O_2 = D_2.(Ls.C_2 + Rs.C_{10})$$
$$O_3 = H_3.(Ls.C_3 + Rs.C_9)$$
$$O_4 = H_4.(Ls.C_4 + Rs.C_8)$$
$$O_5 = H_5.(Ls.C_5 + Rs.C_7)$$
$$O_6 = H_6.O_6$$
$$O_7 = H_7.(Ls.C_7 + Rs.C_5)$$
$$O_{3\text{-}12} = O_3 + O_4 \ldots + O_{12}$$
$$O_8 = H_8.(Ls.C_8 + Rs.C_4)$$
$$O_9 = H_9.(Ls.C_9 + Rs.C_3)$$
$$O_{10} = H_{10}.(Ls.C_{10} + Rs.C_2)$$
$$O_{11} = H_{11}.(Ls.C_{11} + Rs.C_1)$$
$$O_{12} = H_{12}.Rs.C_0$$

The signals $O_0$, $O_1$, $O_2$, and $O_{1\text{-}2}$ are produced in logical gating circuits 410–0, 410–1, 410–2, and 410–12, respectively, the gating circuits being mechanized with conventional "and" and "or" circuits as having already been described. The mechanization of the "and" and "or" circuits for the signals $O_0$, $O_1$, $O_2$, and $O_{1\text{-}2}$ follow the appropriate equations hereinabove. Signals $O_3$ through $O_{12}$ corresponding to selected drum signals are derived through a corresponding set of diode bridge circuits 420–3 through 420–12 under the control of logical gating circuits 410–3 through 410–12, respectively, the specific mechanization of diode bridge circuit 420 being illustrated in circuit 420–3. It will be appreciated at this point that the logical gating circuits 410–3 through 410–12 respectively correspond to the equations above for signals $O_3$ through $O_{12}$. Each of the diode bridge circuits has an input terminal 421, control terminals 422 and 423, and an output terminal 424. Logical gating circuits 410–3 through 410–12 are mechanized to provide complementary gating signals $G_3$, $\overline{G}_3$ through $G_{12}$, $\overline{G}_{12}$; each gating signal G and its complement $\overline{G}$ being applied to control terminals 422 and 423, respectively. The gating signals are defined so that no gating signal ever appears at output terminal 424.

As illustrated in circuit 420–3, each of the diode circuits includes first and second gating resistors 425 and 426 respectively coupling control terminals 422 and 423 to diode bridge points 427 and 428. Bridge points 427 and 428 are respectively coupled to input terminal 421 through diodes 429 and 430; and to output terminal 424 through diodes 431 and 432. The diodes are selected to have equal impedance characteristics and are connected so that all diodes are forward biased when gating signal G is a high-level signal and $\overline{G}$ is a low-level signal and are back biased when signal G is a low-level signal and $\overline{G}$ is a high-level signal. As an illustration of suitable operating conditions, terminals 421 are shown as being biased at −7.5 volts through head reading transformers 450 and the gating signals are assumed to vary between 0 volts representing binary 1, and −15 volts representing binary 0. With this selection of gating and bias voltages no gating signal appears at output terminal 424.

When the diodes in a bridge circuit are forward biased, the signal applied to input terminal 421 is effectively gated through the bridge circuit to output terminal 424, whereas when the diodes are back biased the bridge is effectively open circuited and no signal passes through.

The gating signals G and $\overline{G}$ utilized to control the gating of signals through the diode bridge circuits are defined as follows:

$$G_3 = Ls.C_3 + Rs.C_9$$
$$\overline{G}_3 = Ls.\overline{C}_3 + Rs.\overline{C}_9$$
$$G_4 = Ls.C_4 + Rs.C_8$$
$$\overline{G}_4 = Ls.\overline{C}_4 + Rs.\overline{C}_8$$
$$G_5 = Ls.C_5 + Rs.C_7$$
$$\overline{G}_5 = Ls.\overline{C}_5 + Rs.\overline{C}_7$$
$$G_6 = C_6$$
$$\overline{G}_6 = \overline{C}_6$$
$$G_7 = Ls.C_7 + Rs.C_5$$
$$\overline{G}_7 = Ls.\overline{C}_7 + Rs.\overline{C}_5$$
$$G_8 = Ls.C_8 + Rs.C_4$$
$$\overline{G}_8 = Ls.\overline{C}_8 + Rs.\overline{C}_4$$
$$G_9 = Ls.C_9 + Rs.C_3$$
$$\overline{G}_9 = Ls.\overline{C}_9 + Rs.\overline{C}_3$$
$$G_{10} = Ls.C_{10} + Rs.C_2$$
$$\overline{G}_{10} = Ls.\overline{C}_{10} + Rs.\overline{C}_2$$
$$G_{11} = Ls.C_{11} + Rs.C_1$$
$$\overline{G}_{11} = Ls.\overline{C}_{11} + Rs.\overline{C}_1$$
$$G_{12} = Rs.C_0$$
$$\overline{G}_{12} = Rs.\overline{C}_0$$

The mechanization of gating circuits 410–3 through 410–12 to provide these signals should be apparent from the examples already considered.

Signals $O_0$, $O_{1\text{-}2}$, and $O_{3\text{-}12}$ are combined in output circuit 500, one form of which is illustrated in FIG. 5, the operation of output circuit 500 being indicated by the waveforms of FIG. 5*a*. Referring now to FIGS. 5 and 5*a*, it will be noted that output circuit 500 includes an amplifier-clipper stage 510 which receives drum signals from any of heads H3 and H12, represented by signal $H_{3\text{-}12}$ of FIG. 5*a*. The signal $H_{3\text{-}12}$ is shown as being shifted a half binary digit position in time since heads $H_{3\text{-}12}$ are positioned in this manner so that the final output signals $O_k$ are produced after a one binary digit delay with respect to the selected signals read from the drum. Thus, output signal $O_{12}$, corresponding to input signal I during a right shift of zero digits, appears delayed one binary digit position in time with respect to signal I.

The signal produced by amplifier-clipper stage 510 is applied to a phase splitting stage 520 which produces complementary signals $O'_{3\text{-}12}$ and $\overline{O}'_{3\text{-}12}$ which are utilized to control the entry of output signals $O_{3\text{-}12}$ into a flip-flop F3–12 under the control of clock pulse signals *Cp*, one signal *Cp* being applied at the beginning of each binary digit time of operation. Flip-flop F3–12 has input circuits 1F3–12 and 0F3–12 and is set, by signals applied separately to input circuits 1F3–12 and 0F3–12, to 1 and 0 representing stable stages, respectively. Input signals are applied to flip-flop F3–12 according to the functions:

$$1F3\text{–}12 = O'_{3\text{-}12}.Cp$$

and $$0F3\text{–}12 = \overline{O}'_{3\text{-}12}.Cp$$

the input signals being produced by "and" circuits 530 and 531, respectively. Flip-flop F3–12 then produces output signal O3–12 as indicated in FIG. 5*a*. Signals $O_1$ and $O_2$ are combined in an "or" circuit 532 and entered into a buffer flip-flop F1–2 producing a corresponding output signal $O_{1\text{-}2}$ after a binary digit delay.

Specific circuits suitable for amplifier-clipper stage 510, phase splitting stage 520, and flip-flops $F_{1\text{-}2}$ and $F_{3\text{-}12}$ are well known in the electronic art and therefore are not described herein. Suitable circuits, for example, are described in the above-mentioned patent by George Stibitz and in the article by F. C. Williams.

From the foregoing description, it is apparent that the present invention provides a high-speed electronic circuit for selectively shifting the time position of digital data; and that the shifting circuit may readily be incorporated into a magnetic drum computing system with a minimum of additional writing and reading circuits and associated amplification stages. While the invention has been described with particular reference to a system wherein input signals I, to be shifted, are applied through an input circuit to a parallel writing head on a drum, the shift desired then being obtained through a series of reading circuits; it will be understood that other modifications are possible. For example, an equivalent circuit is one wherein input signals I are written through a series of writing circuits R0 through R*n* and read from a fixed position through a parallel reading head. In the equivalent circuit signals I are written on the drum through circuit R*k* for a left shift of *k* digits and through circuit R*n*—*k* for a right shift of *k* digits, right shift being performed by initially entering signals I on to drum 100 through circuit R*k* during *n* successive digit time intervals, as discussed above.

In general, the parallel writing and series reading operation described in detail above is preferred where the head size necessitates the utilization of several drum channels. If input signal I is recorded only through a writing circuit R*k*, as in the equivalent circuit described above, the parallel reading amplifier must function to distinguish the signals on a single channel from any spurious noise which may exist on the other channels.

It will also be appreciated by those skilled in the art that means, other than a magnetic drum, for providing the delay intervals for shifting the information may be employed. For example, a magnetic tape with suitably arranged writing and reading heads may be employed or any of the well known delay elements similar to the delay elements mentioned hereinabove and which elements have the desired storage capacity.

Additionally, even though the operation of the shifting circuit was described hereinabove in terms of simple left and right shift operations, it will be recognized that the invention may be utilized for extract operations in a business data computer as mentioned hereinabove. For example, a word group may be of a predetermined length sufficient to include more than one word (a word group of ten bits may include three 3-bit words). In this instance, if the middle three bit words are desired for use in the computer, a right shift signal will rearrange the word grouping and the undesired bits to the left of the desired word may be inhibited in any well known manner thereby extracting the desired word (3 bits) from the complete word (10 bits).

While specific circuits have been described in detail, and the invention has been described on the basis of several specific assumptions listed above, it will be understood that the invention is not so limited. For example, other types of recording may be utilized in place of the "flux-change" recording described; any number *n* of shifts desired may be specified; the digits may be binary digits instead of groups of four binary digits; and the parameter *m* may be varied accordingly as head design is modified. Other modifications, of course, will be apparent to those skilled in the art.

What is claimed as new is:

1. An electronic circuit for selectively shifting in response to applied shift signals the time position of a series of input signals representing a corresponding series of digits to produce a corresponding series of time-shifted output signals, said applied shift signals including shift direction signals indicating the direction of shift, and shift magnitude signals indicating the amount of shift, said circuit comprising: means for serially applying the series of input signals; a plurality of delay circuits, coupled to said means and responsive to said series of input signals for producing in parallel a corresponding plurality of series of delayed output signals, each successive one of said series being delayed by an increasing number of digits with respect to said series of input signals; a shift control matrix responsive to the shift magnitude signals for producing shift control signals; a gating matrix coupled to said delay circuits and said shift control matrix and responsive to said plurality of series of delayed output signals, to said shift control signals, to the input signals, and to the shift direction signals for selectively gating said plurality of series of delayed output signals for producing an intermediate signal series; and an output circuit coupled to said gating matrix and responsive to said intermediate signal series for producing the corresponding series of time-shifted output signals.

2. The circuit defined in claim 1 wherein said plurality of delay circuits includes series connected delay sections D1 . . . D*m*, producing delayed output signals in response to said series of input signals after delays of 1 . . . *m* digit time intervals, respectively, and includes a rotatable magnetic drum circuit having an input circuit, a writing head coupled to said input circuit, and a plurality of reading heads H(*m*+1) . . . H*n*, positioned from said writing head along the circumference of the drum in the direction of drum rotation so as to provide right-read digit delays of (*m*+1) . . . *n* digits, respectively, (*m*+1) representing an integer delay corresponding to the minimum head spacing between said writing head and said reading head H(*m*+1), allowing reliable writing and reading without crosstalk therebetween, and *n* representing an integer number of delays utilized in the shifting operation.

3. The circuit defined in claim 2 wherein said series of input signals are applied to said input circuit and to delay section D1, and wherein said gating matrix means is operative to apply the series of delayed output signals produced by one of said delay sections D1 . . . D*m* or by one of said reading heads H(*m*+1) . . . H*n*, corresponding to said series of input signals shifted by the amount and in the direction specified by the shift direction signals, to said output circuit.

4. The circuit defined in claim 3 wherein the shift magnitude signals include a set of coded signals S*hj* representing an amount of shift of *k* digits, *k* being any integer digit length and *j* indicating the code digit position, the direction of the shift being specified by a right-shift direction signal R*s* and a left-shift direction signal L*s*; wherein and shift control matrix produces a series of shift control signals $C_0$ . . . $C_k$ . . . $C_n$, each shift control signal $C_k$ representing the amount of shift *k* specified by the corresponding set of signals S*hj*; and wherein said gating matrix is responsive to each shift control signal $C_k$ and signal L*s* for applying the input signals through a delay circuit having a *k* digit length, and is responsive to each shift control signal $C_k$ and signal R*s* for applying the input signals through a delay circuit of *n*—*k* digit length.

5. A high-speed shifting circuit for selectively shifting the time position of a series of input signals $I_n$ . . . $I_1$, representing a corresponding series of digits, by an amount *k* specified by a set of shift magnitude signals $Sh^j$, *k* representing an integer digit length and *j* indicating the selection code digit positions; the circuit also being responsive to signals R*s* and L*s* respectively specifying right and left shift directions, said circuit comprising: *n* delay circuits, responsive to applied input signals for producing delayed output signals in parallel after delays of 1, . . . and *n* digits, respectively; an output circuit; a signal actuable gating matrix, coupled to said output circuit and responsive to applied shift control signals and to signals R*s* and L*s*, for applying signals I through one of said *n* delay circuits to said output circuit, said output circuit then producing an output signal series $O_k$ corresponding to signals I shifted by the amount *k*, and in the specified shift direction; and a shift control matrix, coupled to said gating matrix responsive to each signal set $Sh^j$, for producing one of a series of shift control signals $C_0 \ldots C_k \ldots C_n$, the shift control signal $C_k$ produced representing the amount of shift *k* specified by the corresponding set of signals $Sh^j$, said gating matrix being operative to apply signals I through one of said *n* delay circuits of *k* digit length in response to a shift control signal for $C_k$ for left shifts and to apply signals I through one of said *n* delay circuits of $n-k$ digit length in response to a shift control signal $C_k$ for right shifts.

6. The circuit defined in claim 5 wherein said *n* delay circuits include series connected delay sections D1 . . . D*m*, producing delayed output signals in response to applied input signals after delays of 1 . . . *m* digit time intervals, respectively, and include a rotatable magnetic drum circuit having an input circuit, a writing head coupled to said input circuit, and a plurality of reading heads H($m$+1) . . . H*n*, positioned from said writing head along the circumference of the drum in the direction of drum rotation so as to provide write-read digit delays of ($m$+1) . . . *n* digits, respectively, ($m$+1) representing an integer delay corresponding to the minimum head spacing between said writing head and said reading head H($m$+1), allowing reliable writing and reading without crosstalk therebetween.

7. The circuit defined in claim 6 wherein the series of input signals are applied to said input circuit and to delay section D1, and wherein said gating matrix is operative to apply the delayed output signals produced by one of said delay sections D1 . . . D*m* or by one of said reading heads H($m$+1) . . . H*n*, corresponding to the input signals shifted by the amount and in the direction specified by the shift control and shift direction signals, respectively, to said output circuit.

8. The circuit defined in claim 7 wherein *m* is equal to 2 and *n* is equal to 12, the 12 delay circuits including delay sections D1 and D2 and reading heads H3 through H12; and wherein said gating matrix includes a drum gating matrix for selectively combining the signals produced by heads H3 through H12 and an amplification stage for producing any of the output signal series $O_3$ through $O_{12}$.

9. A shifting circuit comprising, means providing a first control signal representative of the magnitude of the shift, means providing a second control signal representative of the direction of the shift, time delay means responsive to signals applied thereto for providing a plurality of parallel signals from each of the applied signals at predetermined intervals, circuit means including individual coincidence circuit means for responding to said first and second control signals in combination with one of said signals applied thereto from said time delay means for providing an output signal from the shifting circuit correlated to said control signals, and means for applying input signals to said time delay means and said circuit means.

10. A shifting circuit for shifting the time position of binary-coded information to the right or left, said circuit comprising, means for delivering binary-coded information in signal groups, delay means for receiving and delaying the signal groups and characterized as having a storage time substantially equivalent to the duration of an information group, said delay means being further arranged to provide each signal of each signal group in a parallel relationship, means including a gating matrix for directly receiving said signal groups and the parallel signals from said delay means and providing the shifted signals therefrom, means for providing a shift magnitude signal and for coupling same into said gating matrix, and means for providing a right or left shift signal and for coupling one of said signals to said gating matrix, said right shift signal being effective after one complete signal group has been applied to said delay means.

11. A circuit arrangement for shifting the time position of binary-coded information for use in a digital computer comprising delay means for receiving an information bearing signal, for providing a corresponding plurality of differently delayed signals from the signal applied thereto in a parallel arrangement, means for providing control signals representing a particular time position shift, awitching means coupled to said delay means and to said control signals providing means for receiving said plurality of delayed signals and said control signals and for selecting the delayed signal corresponding to said particular time position shift from said plurality, and means coupled to said switching means for receiving said selected signal and for providing said selected signal as an output.

12. A circuit arrangement for shifting the time position of binary-coded information for use in a digital computer comprising input means for receiving information bearing input signals, delay means coupled to said input means for providing a corresponding plurality of differently delayed signals from said input signal and for providing said plurality in a parallel arrangement, means for receiving signals representing the magnitude and direction of a desired time position shift and for providing control signals indicative of a particular delayed signal, switching means coupled to said delay means and to said control signal providing means for selecting said particular delayed signal, and output means coupled to said switching means for receiving said selected signal and for providing said selected signal as an output.

13. A digital computer including delay circuit means for receiving a binary-coded signal, for providing a corresponding plurality of differently delayed binary-coded signals from said signal, and for providing the thus delayed signals in a parallel relationship, circuit means coupled to said delay means and responsive to each of the parallel signals from said delay circuit means, means for applying said binary-coded signal to said delay circuit means and to said circuit means, means for generating a control signal indicating the mganitude of shift of said binary-coded signal, means for generating a control signal indicating the direction of shift of said binary-coded signal, said circuit means being responsive to the combination of said shift magnitude signal, said shift direction signal, and said delayed binary-coded signal to produce a corresponding output signal shift in time position from said binary-coded signal.

14. Apparatus for providing a variable time delay comprising a medium adapted to receive magnetic recording, a plurality of channels defined on said medium, each of said channels consisting of a plurality of discrete magnetic cells defined on said channel, magnetizing transducer means controlled by electrical signals for selectively magnetizing said cells, said transducer means disposed adjacent said medium such that one cell of each channel in said plurality is magnetized simultaneously, and a plurality of sensing transducers for detecting the state of magnetization of a cell and providing an electrical signal related to said state said plurality disposed adjacent said channels such that the numbers of cells between said magnetizing transducer means and said sensing transducers are different.

15. Apparatus for providing a variable time delay comprising a medium adapted to receive magnetic recording, a plurality of channels defined on said medium, each of said channels consisting of a plurality of discrete magnetic cells defined on said channel, magnetizing transducer means controlled by electrical signals for selectively magnetizing said cells, said transducer means disposed adjacent said medium such that one cell of each channel in said plurality is magnetized simultaneously, and a plurality of sensing transducers for detecting the state of magnetization of a cell and providing an electrical signal related to said state, said plurality including a first sensing transducer disposed adjacent a first channel as close to said magnetizing transducer means as physical and electrical limitations permit, and subsequent sensing transducers disposed adjacent subsequent channels such that the number of cells between said magnetizing trans ducer means and said sensing transducers is different for each channel.

16. Apparatus for providing a variable time delay comprising a rotatable drum coated with magnetizable material, a plurality of circumferential channels defined about said drum, each of said channels consisting of a plurality of discrete magnetic cells defined on said channel, a write head controlled by electrical signals for selectively magnetizing said cells, said write head extending across a plurality of channels such that one cell of each channel in the plurality is magnetized simultaneously, and a plurality of read heads for sensing the state of magnetization of a cell and providing an electrical signal related to said state, said plurality including a first read head mounted adjacent a first channel as close to said write head as physical and electrical limitations permit, and subsequent read heads mounted adjacent subsequent channels such that the numbers of cells between said write head and said read heads are different.

17. Apparatus for providing a variable time delay comprising a medium adapted to receive magnetic recording, a plurality of channels defined on said medium, each of said channels consisting of a plurality of discrete magnetic cells defined on said channel, magnetizing transducer means controlled by electrical signals for selectively magnetizing said cells, said transducer means disposed adjacent said medium such that one cell of each channel in said plurality is magnetized simultaneously, a plurality of sensing transducers for detecting the state of magnetization of a cell and providing an electrical signal related to said state, said plurality disposed adjacent said channels such that the numbers of cells between said magnetizing transducer means and said sensing transducers are different, and a plurality of electronic delay elements controlled by said electrical signals providing relatively short time delays.

18. Apparatus for providing a variable time delay comprising a medium adapted to receive magnetic recording, a plurality of channels defined on said medium, each of said channels consisting of a plurality of discrete magnetic cells defined on said channel, magnetizing transducer means controlled by electrical signals for selectively magnetizing said cells, said transducer means disposed adjacent said medium such that one cell of each channel in said plurality is magnetized simultaneously, a plurality of sensing transducers for detecting the magnetization of a cell and providing an electrical signal relating to said state, said plurality including a first sensing transducer disposed adjacent a first channel as close to said magnetizing transducer means as physical and electrical limitations permit, and subsequent sensing transducers disposed adjacent subsequent channels such that the number of cells between said magnetizing transducer means and said sensing transducers is different for each channel, and a plurality of electronic delay elements controlled by said electrical signals for providing time delays of less duration than the physical separation of said magnetizing transducer means and said first sensing transducer permits.

19. An electronic circuit for selectively shifting in response to applied shift signals the time position of a series of input signals representing a corresponding series of digits to produce a corresponding series of time-shifted output signals, said applied shift signals including shift direction signals indicating the direction of shift, and shift magnitude signals indicating the amount of shift, said circuit comprising: means for serially applying the series of input signals; a plurality of delay circuits coupled to said means and responsive to said series of input signals for producing in parallel a corresponding plurality of series of delayed output signals, each successive one of said series being delayed by a corresponding number of digits with respect to said series of input signals, said delay circuits including a medium adapted to receive magnetic recording, a plurality of channels defined on said medium, each of said channels consisting of a plurality of discrete magnetic cells defined on said channel, magnetizing transducer means controlled by electrical signals for selectively magnetizing said cells, said transducer means disposed adjacent said medium such that one cell of each channel in said plurality is magnetized simultaneously, and a plurality of sensing transducers for detecting the magnetization of a cell and providing an electrical signal relating to said state, said plurality disposed adjacent said channels such that the numbers of cells between said magnetizing transducer means and said sensing transducers are different; a shift control matrix responsive to the shift magnitude signals for producing shift control signals; a gating matrix coupled to said delay circuits and said shift control matrix and responsive to said plurality of series of delayed output signals, to said shift control signals, to the input signals, and to the shift direction signals for selectively gating said plurality of series of delayed output signals for producing an intermediate signal series; and an output circuit coupled to said gating matrix and responsive to said intermediate signal series for producing the corresponding series of time-shifted output signals.

References Cited in the file of this patent

UNITED STATES PATENTS

| | | |
|---|---|---|
| 2,403,561 | Smith | July 9, 1946 |
| 2,620,890 | Lee et al. | Dec. 9, 1952 |
| 2,634,052 | Block | Apr. 7, 1953 |
| 2,666,575 | Edwards | Jan. 19, 1954 |
| 2,674,732 | Robbins | Apr. 6, 1954 |
| 2,770,797 | Hamilton et al. | Nov. 13, 1956 |
| 2,801,334 | Clapper | July 30, 1957 |
| 2,876,437 | Johnson | Mar. 3, 1959 |

OTHER REFERENCES

Electronics, vol. 25, No. 9, September 1952, pages 101 to 105.

The Transistor—Characteristics and Applications, Bell Telephone Laboratories, Inc., New York, N.Y. Copyright 1951, pages 562, 574, 581, 607, 621 to 625.